July 25, 1950            A. FOGEL            2,516,457
SCREW HOLDING SCREW DRIVER
Filed Sept. 11, 1946
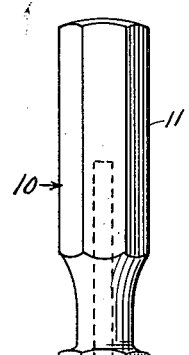
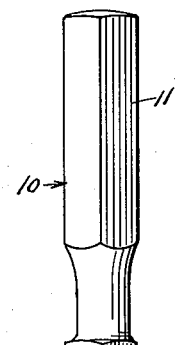
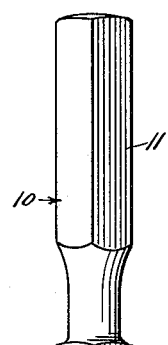
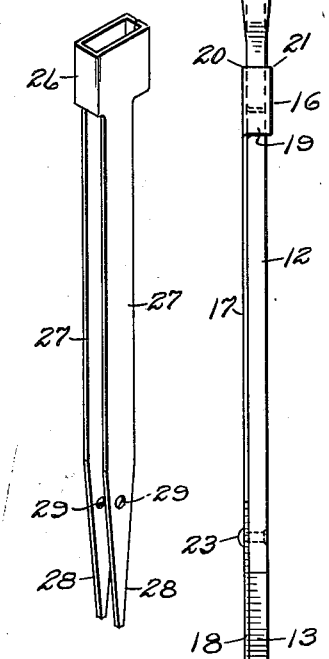
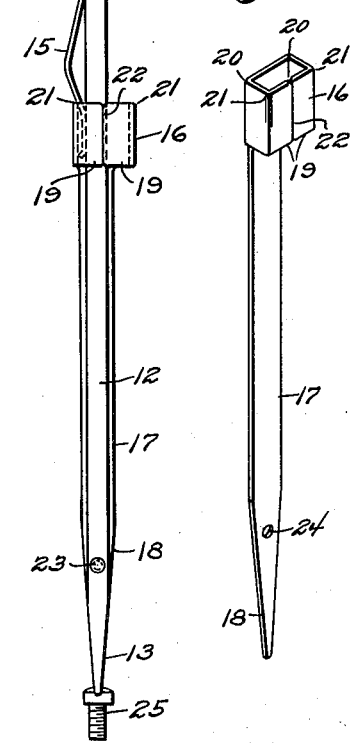
INVENTOR.
Aaron Fogel
BY *Victor J. Evans & Co.*
ATTORNEYS Patented July 25, 1950

2,516,457

UNITED STATES PATENT OFFICE 2,516,457

SCREW HOLDING SCREW DRIVER

Aaron Fogel, Jackson Heights, N. Y.

Application September 11, 1946, Serial No. 696,099

1 Claim. (Cl. 145—50)

This invention relates to an attachment for a screw driver which will retain the screw on the end of the screw driver during the placing, screwing or removal of the screw.

An object of the invention is to provide a spring actuated attachment for a screw driver that will retain the screw on the end of the screw driver.

Another object of the invention is to provide an attachment that is simple in construction, durable in use, efficient in operation and can be inexpensively manufactured.

With the above and other objects in view, the invention consists of the novel details of construction, arrangement and combination of parts more fully hereinafter described, claimed and illustrated in the accompanying drawings in which:

Figure 1 is an elevational view of an embodiment of the invention;

Figure 2 is an elevational view of Figure 1 turned at a ninety degree angle with the attachment in non-operative position;

Figure 3 is the same as Figure 2 with the attachment in operative or screw retaining position;

Figure 4 is a perspective view of the attachment and

Figure 5 is a perspective view of a modified form thereof.

Referring more in detail to the drawings, the reference numeral 10 designates a conventional screw driver, comprising the handle 11, and the shank 12, having the tapered screw driving edge 13.

Secured to the shank 12 adjacent the handle 11 by a rivet 14 is the curved leaf spring 15 which, depending from the rivet 14, in parallel relation to the shank 12, terminates within the open rectangular shaped box-like formation 16, having the integral depending arm 17 extending to a point equal to the shank 12 and provided with a tapered edge 18 of the conformation of the point 13 of the shank 12.

The arm 17 is of a greater width than the shank 12, and the formation 16 is formed by arms 19 which, extending at right angles from the arm, at the top thereof, are bent at their respective points 20 and 21 to meet at the central point 22 to complete the formation.

The arm 17, at a point within the taper of the edge 18, but above the taper of the edge 13, is pivotally mounted on the shank 12 by a pivot pin 23 entering the aperture 24 in the arm 17.

The spring 15, as shown in Figure 2, engages the formation 16 outwardly of the shank at one side thereof, so that the edges 13 and 18 are not in alinement, but in operative screw retaining position. The formation 16 is pressed inwardly to aline the edges 13 and 18, so that a screw 25 is retained in driving position when the edges are inserted in the slot in the head thereof by the pressure exerted thereon by means of the spring 15.

In Figure 5, the box-like formation 26 which is formed in the same manner as the box-like formation 16 is provided with opposed parallel similarly shaped arms 27 having the tapered edges 28 and apertures 29 which are mounted exactly as previously described, except that an arm is positioned on opposite sides of the shank 12.

The operation of this form is as previously described, and is used in conjunction with the spring 15 in place of the form previously described.

It is believed that the above description, when taken in conjunction with the drawings, will adequately describe the construction and operation of the invention to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

In a screw holding means for a screwdriver having a shank provided at one end with a tapered screw driving edge and at the opposite end with a handle the improvement comprising an arm of greater width than said shank pivotally mounted on said shank for lateral movement in relation to said shank, and said arm having a tapered end conforming to the shape of the tapered screw driving edge of said shank whereby the tapered end of the arm will be in alinement with the tapered driving edge of said shank when in screw retaining position and out of alinement when in non-retaining position, a pair of L-shaped members extending at right angles to the end of the arm remote from the tapered end, said members being integral with said arm and said members and said arm forming a sleeve open on each end and the axis of the sleeve extending longitudinally of the arm, and the shank passes through said sleeve, and the transverse dimension of said sleeve parallel to the plane in which the arm pivots is of greater dimension than the corresponding transverse dimension of the shank, a leaf spring rigidly fixed to said shank adjacent the handle, and engaging said arm within said sleeve and adapted to force the tapered end of said arm laterally of the tapered screw driving edge of said shank so that a screw is retained on the tapered screw driving edge of said shank by the action of said spring.

AARON FOGEL.

REFERENCES CITED

The following references are of record in the file of this patent:

UNITED STATES PATENTS

| Number | Name | Date |
|---|---|---|
| 141,857 | Davis | Aug. 19, 1873 |
| 1,699,306 | Millen | Jan. 15, 1929 |

FOREIGN PATENTS

| Number | Country | Date |
|---|---|---|
| 723,947 | France | Jan. 23, 1932 |